(12) United States Patent
King et al.

(10) Patent No.: US 6,890,014 B1
(45) Date of Patent: May 10, 2005

(54) CONVERSION VEHICLE

(75) Inventors: E. Mackey King, Howell, MI (US); Paul Lester, Commerce Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/763,705

(22) Filed: Jan. 23, 2004

(51) Int. Cl.$^7$ .................................................. B60P 3/34
(52) U.S. Cl. .............................. 296/26.09; 296/99.1
(58) Field of Search ....................... 296/26.08, 26.09, 296/99.1, 100.02

(56) References Cited

U.S. PATENT DOCUMENTS

| | | | | |
|---|---|---|---|---|
| 3,419,304 A | * | 12/1968 | Sangimino | 296/99.1 |
| 4,659,136 A | * | 4/1987 | Martin et al. | 296/100.04 |
| 4,842,326 A | * | 6/1989 | DiVito | 296/193.04 |
| 5,087,091 A | * | 2/1992 | Madill | 296/26.11 |
| 6,186,575 B1 | * | 2/2001 | Fisher et al. | 296/100.03 |
| 6,435,606 B1 | * | 8/2002 | Miklosi et al. | 296/216.07 |
| 6,517,135 B2 | * | 2/2003 | de Gaillard | 296/26.09 |
| 6,547,298 B2 | * | 4/2003 | Sotiroff et al. | 296/24.43 |
| 6,588,824 B2 | | 7/2003 | Neubrand | |
| 2002/0008396 A1 | * | 1/2002 | De Gailard | 296/26.09 |
| 2002/0079719 A1 | * | 6/2002 | Crijns et al. | 296/102 |
| 2003/0122395 A1 | * | 7/2003 | Van Bussel | 296/26.09 |
| 2003/0164622 A1 | * | 9/2003 | De Gaillard | 296/26.09 |
| 2004/0026948 A1 | * | 2/2004 | Novajovsky | 296/26.08 |

\* cited by examiner

*Primary Examiner*—D. Glenn Dayoan
*Assistant Examiner*—Patricia L. Engle
(74) *Attorney, Agent, or Firm*—Ralph E. Smith

(57) ABSTRACT

An apparatus is provided for enabling the enlargement of the cabin for a vehicle having an enclosed cabin and a cargo bed extending rearwardly from the cabin. The apparatus includes a rear wall removably coupled to the cabin. A guide element is positioned along a floor of the cargo bed and a base portion of the rear wall is slideably coupled to the guide element, which enables the rear wall to be translated rearwardly from the cabin to vary a volume thereof.

13 Claims, 4 Drawing Sheets

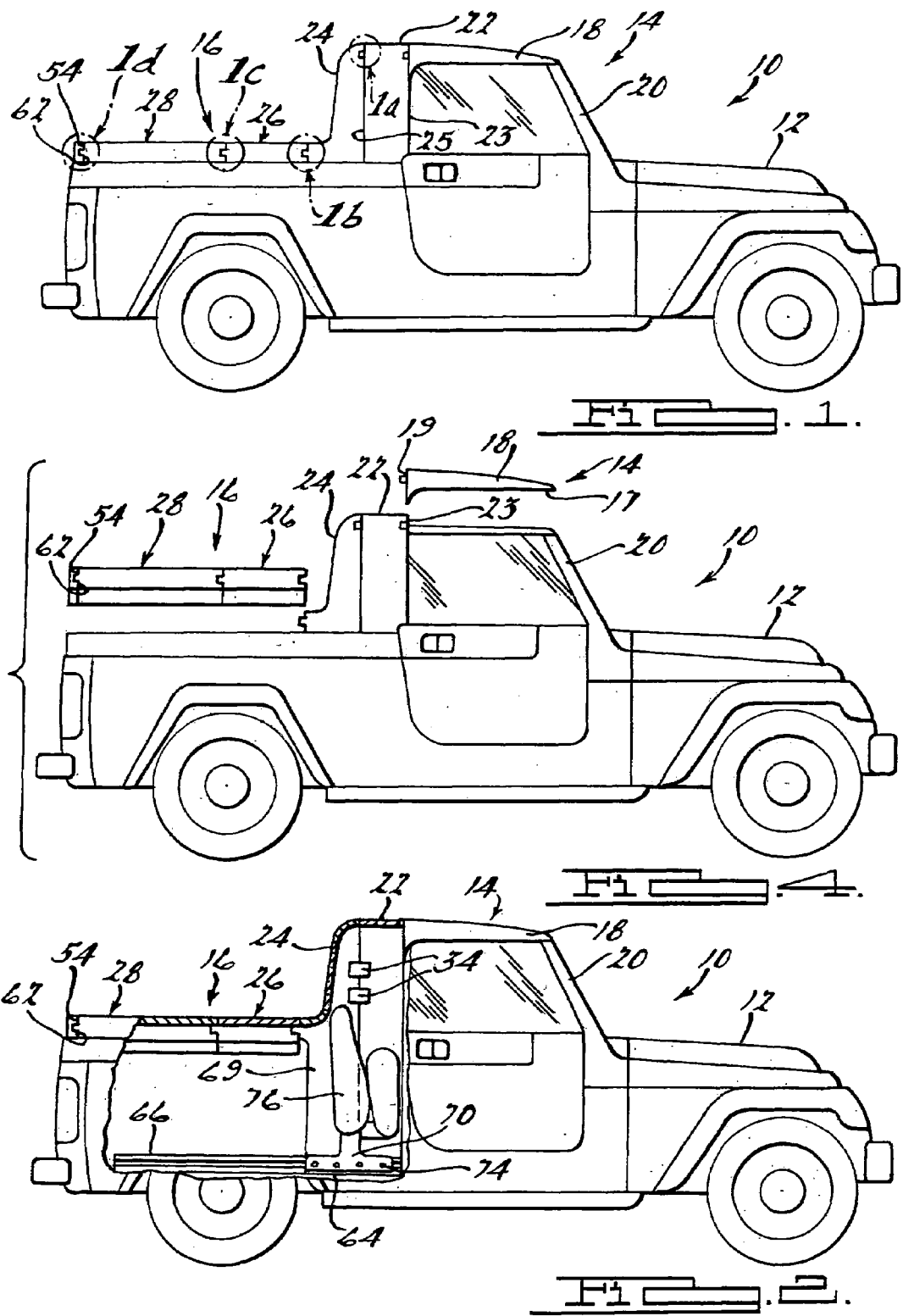

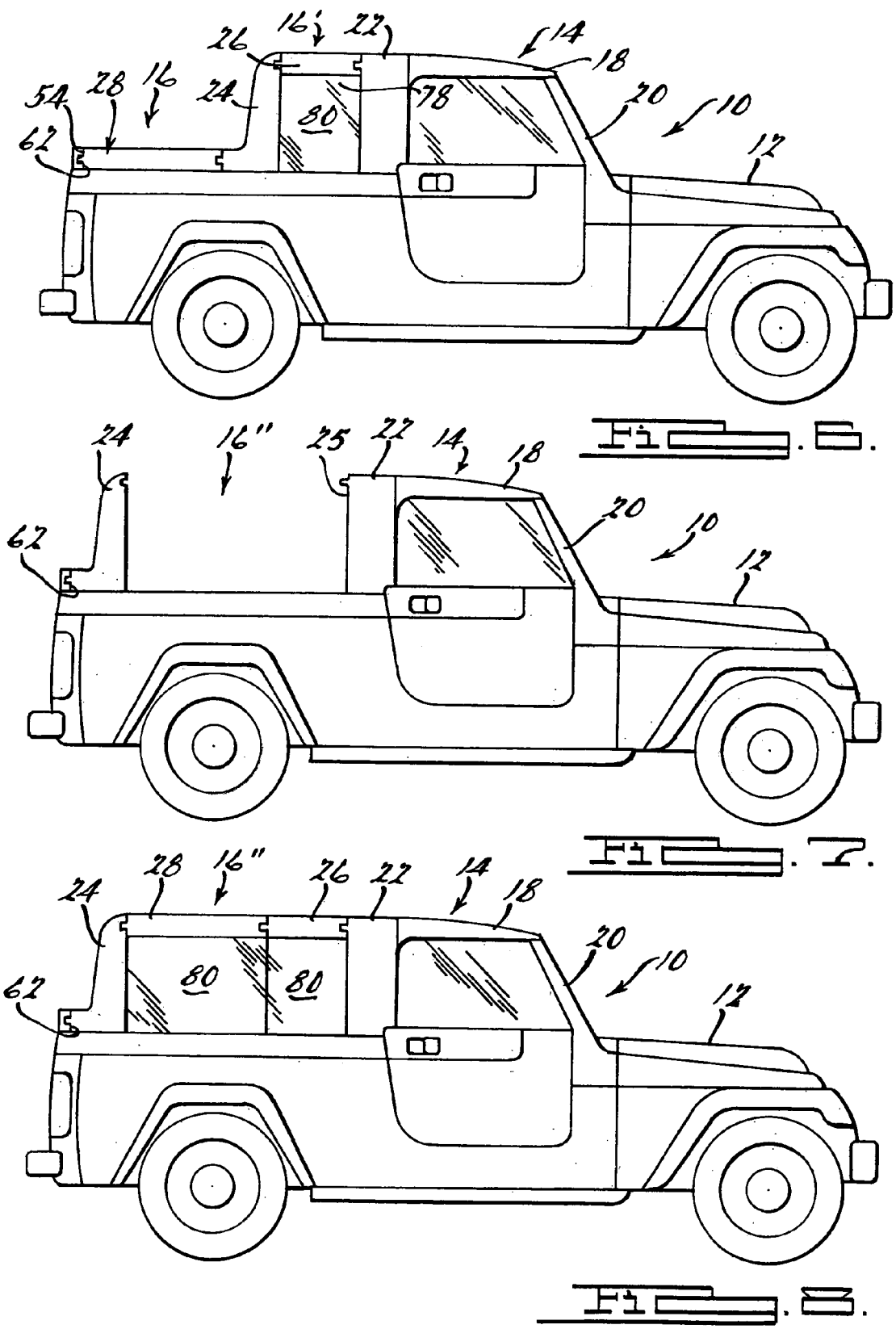

ns, and more particularly to a vehicle body capable of
CONVERSION VEHICLE

FIELD OF THE INVENTION

The present invention relates to vehicle body configurations, and more particularly to a vehicle body capable of converting between two-passenger and four-passenger configurations.

BACKGROUND OF THE INVENTION

Currently, consumers seeking a vehicle with cargo carrying capabilities, such as a truck, are limited to either selecting a two-passenger cabin or a four-passenger cabin. A consumer desiring a four passenger cabin typically must endure a reduction in cargo carrying capabilities. Specifically, the extra row of seats for a four passenger cabin requires a large part of the truck's cargo area, reducing the type of objects that can be transported, such as longer pieces of lumber.

On the other hand, those consumers who prefer a two passenger cabin must forgo any hope of having extra seating area. Otherwise, they must decide if they are going to potentially sacrifice cargo area for a four passenger cabin. Accordingly, a need exists for a vehicle capable of converting between either a four-passenger or a two-passenger cabin configuration.

SUMMARY OF THE INVENTION

The present invention provides an apparatus for enabling the enlargement of the cabin for a vehicle having an enclosed cabin and a cargo bed extending rearwardly from the cabin. The apparatus includes a rear wall removably coupled to the cabin. A guide element is positioned along a floor of the cargo bed and a base portion of the rear wall is slideably coupled to the guide element, which enables the rear wall to be translated rearwardly from the cabin to vary a volume thereof.

BRIEF DESCRIPTION OF THE DRAWINGS

The present invention will become more fully understood from the detailed description and the accompanying drawings, wherein:

FIG. 1 is a side view of a conversion vehicle in a two passenger configuration according to the principles of the present invention;

FIG. 1a is an enlarged view of the vehicle of FIG. 1 as indicated by circle 1a.

FIG. 2 is a partial cross-sectional view of the vehicle of FIG. 1;

FIG. 4 is an exploded side view of the conversion vehicle of FIG. 1;

FIG. 6 is a side view of the vehicle of FIG. 5 having an enclosed cabin;

FIG. 6a is a top view of the vehicle of FIG. 6;

FIG. 6b is a cross sectional view of the vehicle of FIG. 6a along line 6b–6b;

FIG. 7 is a side view of the vehicle having an extended open air cabin according to the principles of the present invention; and FIG. 8 is a side view of the vehicle of FIG. 7 having an enclosed cabin.

DETAILED DESCRIPTION OF THE PREFERRED EMBODIMENTS

Figure 1A:
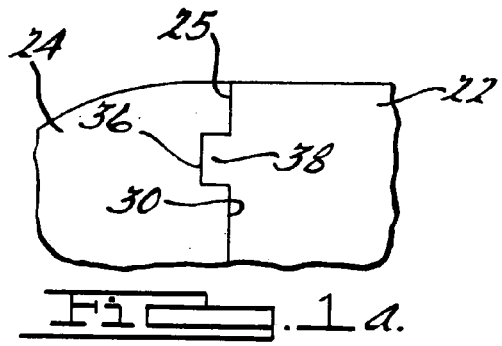

The following description of the preferred embodiments is merely exemplary in nature and is in no way intended to limit the invention, its application, or uses.

The present invention is generally related to a vehicle capable of converting from a two passenger to four passenger configuration. The present invention will be described as applicable to a lightweight pickup. However, it is to be understood that the principles embodied herein are equally applicable to other types of vehicles, such as, for example, full-size trucks and truck-hybrids.

Referring to FIG. 1, a vehicle 10 is shown. The vehicle 10 has an engine compartment 12 coupled to a passenger cabin 14. The passenger cabin 14 is further coupled to a cargo area 16. The passenger cabin 14 includes a lift off roof panel 18. As shown in FIG. 4, roof panel 18 has a first edge 17 and a second edge 19. The roof panel 18 is coupled at the first edge 17 to an A-pillar 20 and coupled at the second edge 19 to a B-pillar 22 as best shown in FIG. 4. The B-pillar 22 has a first edge 23 and a second edge 25. The first edge 23 is coupled to the second edge 19 of the roof panel 18 and the second edge 25 couples the B-pillar 22 to the cargo area 16 as best shown in FIG. 1.

Figure 1B:
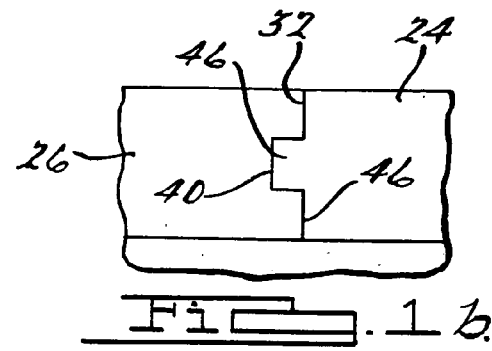
FIG. 1b is an enlarged view of the vehicle of FIG. 1 as indicated by circle 1b.
Figure 1C:
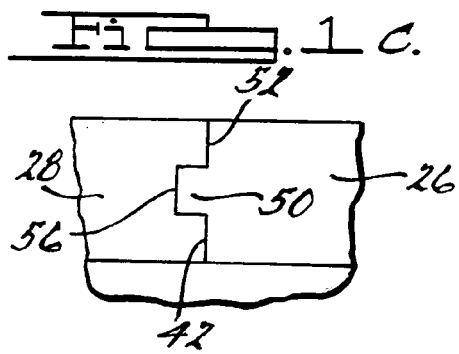
FIG. 1c is an enlarged view of the vehicle of FIG. 1 as indicated by circle 1c.
Figure 1D:
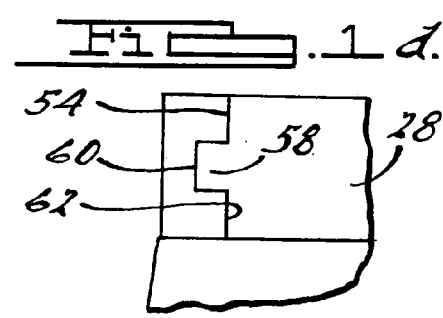
FIG. 1d is an enlarged view of the vehicle of FIG. 1 as indicated by circle 1d.

The cargo area 16 includes a targa bar 24, which can generally be described as a U-shaped support beam generally following the contour of a rear end of passenger cabin 14, forming a rear wall, as known in the art. The targa bar 24 is attached to a first tonneau cover 26. The first tonneau cover 26 is in turn attached to a second tonneau cover 28. The targa bar 24 has a first end 30, as shown in FIG. 1a, and a second end 32, as shown in FIG. 1b. The first end 30 is removably coupled to the B-pillar 22 via a plurality of latches 34 as shown in FIG. 2. In addition, as shown in FIG. 1a, the first end 30 has a plurality of detents 36 which are configured to mate with a plurality of protrusions 38 on the second edge 25 of the B-pillar 22. Referring to FIG. 1b, a second end 32 of the targa bar 24 is removably coupled to the first tonneau cover 26. The first tonneau cover 26 includes a first edge 40, as shown in FIG. 1b, and a second edge 42 as best shown in FIG. 1c. The first edge 40 has a plurality of detents 44 which engage a plurality of protrusions 46 located along a second edge 42 of the targa bar 24, as shown in FIG. 1b. The second edge 42 has a plurality of protrusions 50, as shown in FIG. 1c, which mate with the second tonneau cover 28. Specifically, the second tonneau cover 28 has a first edge 52, as shown in FIG. 1c, and a second edge 54, as shown in FIG. 1d. The first edge 52 of the second tonneau cover 28 includes a plurality of detents 56 for engagement with the plurality of protrusions 50 located on the second edge 42 of the first tonneau cover 26 as shown in FIG. 1c. The second edge 54 of the second tonneau cover 28 also has a plurality of protrusions 58 which engage a plurality of detents 60 located along a rear edge 62 of the cargo area 16 as illustrated in FIG. 1d.

Figure 3B:
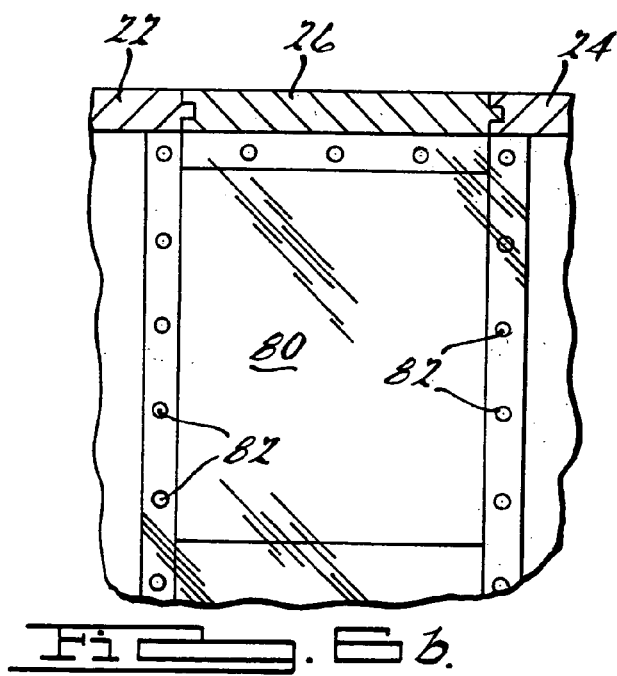
FIG. 3 is a cross sectional view of the rail in FIG. 2.
Figure 3A:
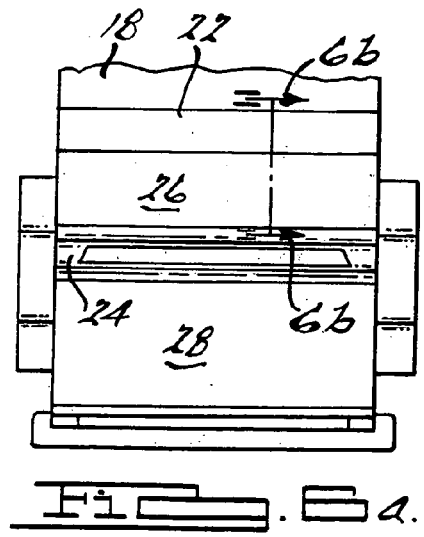
Figure 3:
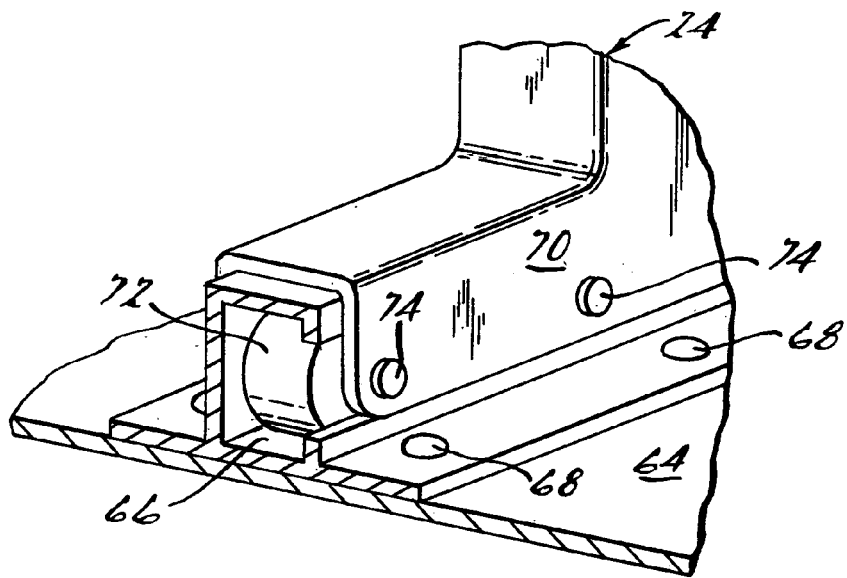

With reference to FIGS. 2 and 3, the targa bar 24 is shown in greater detail. In FIG. 2, the targa bar 24 is shown coupled to the B-pillar 22 and a load floor 64 in the cargo area 16.

Two rails 66 are fixedly attached via fasteners 68 to the load floor 64 to facilitate the movement of the targa bar 24 as shown in FIG. 3. The targa bar 24 has two legs 69, each including a base 70 slidably coupled to the rails 66. As shown in both FIGS. 2 and 3, each base 70 has four casters 72 retained within the base 70 by pins 74 for enabling the targa bar 24 to move along the rails 66. Thus, once the targa bar 24 is uncoupled from the B-pillar 22, the targa bar 24 is free to move along the load floor 64.

Referring back to FIG. 2, the targa bar 24 has an optional seat 76. The seat 76 is a typical bench seat as known in the art. As the targa bar 24 moves toward the rear edge 62 of the cargo area 16, the seat 76 may be unfolded to provide additional seating surfaces.

With reference now to FIG. 4, a partially exploded view of the vehicle 10 is shown. In particular, the roof panel 18, first tonneau cover 26 and second tonneau cover 28 are detached from the vehicle 10. With the first and second tonneau covers 26, 28 removed, the targa bar 24 can be slidably displaced rearwardly from the B-pillar 22 to engage second tonneau cover 28, thereby defining area 16' as shown in FIG. 5.

Figure 5:
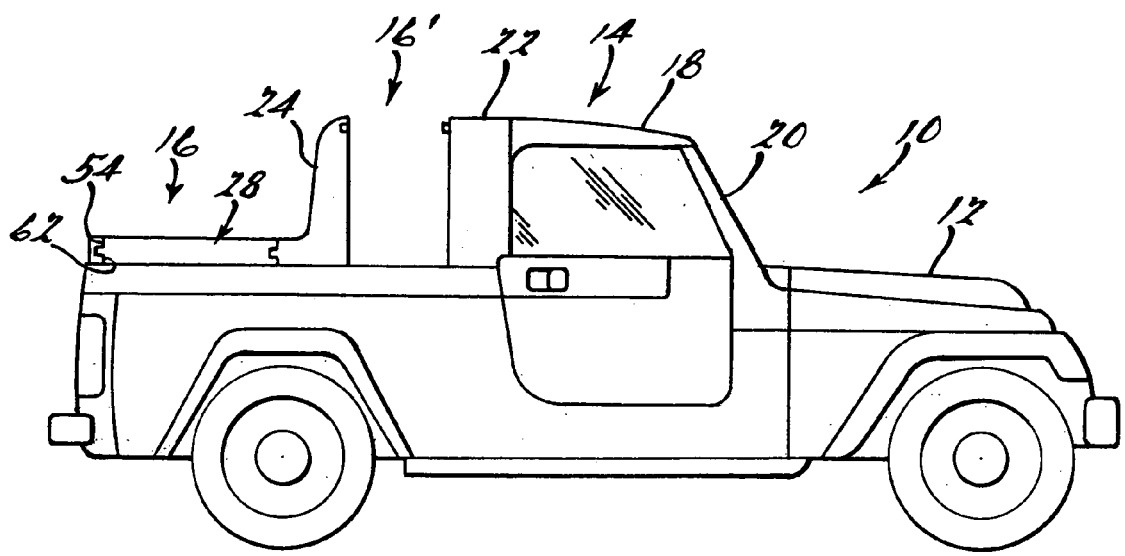
FIG. 5 is a side view of the vehicle in a four passenger configuration having an open cabin according to the principles of the present invention.

As shown in FIGS. 6 and 6a with the targa bar deployed to the position shown in FIG. 5, the first tonneau cover 26 has been reattached to the new cargo area 16' to form an enclosed cargo or expanded section 78. Whether section 78 is considered passenger or cargo space is determined by whether or not seat 76 (FIG. 2) is unfolded or kept stowed. Specifically, the first tonneau cover 26 has been attached to the targa bar 24 and B-pillar 22 via the mating of the detents 44 and protrusions 50 on the first tonneau cover 26 with the detents 36 of the targa bar 24 and the protrusions 38 of the B-pillar 22. Once the first tonneau cover 28 has been coupled between the targa bar 24 and B-pillar 22, optional windows 80 can be snapped between targa bar 24 and B-pillar 22. The optional windows 80 require placement of mating points 82 distributed along the first edge 30 of the targa bar 24 and the second edge 25 of the B-pillar 22 as shown in FIG. 6b.

A second displaced position for the targa bar 24 is shown in FIG. 7. In this position the targa bar 24 is displaced to the rear edge 62 of the cargo area 16 such that detents 60 on the rear edge 62 mate with the protrusions 46 on the second edge 32 of the targa bar 24. The second displaced position for the targa bar 24 creates an enlarged area 16". In FIG. 8, the enlarged area 16" is enclosed via the first tonneau cover 26 and second tonneau cover 28. In particular, the detents 44 on the first tonneau cover 26 mate with the protrusions 38 on the B-pillar 22 and the protrusions 50 on the first tonneau cover 26 engage the detents 56 on the second tonneau cover 28. The protrusions 50 on the second tonneau cover 28 further mate with the detents 36 on the first end 30 of the targa bar 24. The optional windows 80 can be snapped between the targa bar 24 and the B-pillar 22 as shown in FIG. 6b.

The two-different displaced positions for the targa bar 24 provide increased passenger capabilities, or an enlarged enclosed cargo area of the vehicle 10. Additionally, all the parts needed to convert the vehicle store on the vehicle enabling quick changeovers at any location.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a vehicle having an enclosed cabin and a cargo bed extending rearwardly from the cabin, an apparatus for enabling enlargement of the cabin comprising:
   a rear wall removably coupled to the cabin;
   a guide element positioned along a floor of the cargo bed;
   a base portion of the rear wall slideably coupled to the guide element, whereby
   the rear wall may be translated rearwardly from the cabin to vary a volume thereof; and
   a first tonneau cover and a second tonneau cover each removeably coupled to the cargo bed for enclosing the cargo bed in a first position, wherein at least one of the first tonneau cover and second tonneau cover are operable in a second position to enclose the volume existing between the rear wall and the cabin.

2. The vehicle of claim 1 wherein the cabin has a roof removably coupled thereto.

3. The vehicle of claim 1 wherein at least one of the first and second tonneau cover is uncoupled from the cargo bed prior to translating the rear wall.

4. The vehicle of claim 1 wherein the rear wall, cabin, first tonneau cover and second tonneau cover are configured to accept at least one removable window.

5. The vehicle of claim 1 wherein the rear wall includes a seat.

6. The vehicle of claim 1 wherein the rear wall is a targa bar.

7. The vehicle of claim 1 wherein the base includes a plurality of casters which engage the guide member.

8. A pick-up truck comprising:
   an enclosed cabin;
   an open cargo bed extending rearwardly from the cabin, said cargo bed having a guide element positioned along its floor;
   a rear wall removably coupled to the cabin, said rear wall having a base portion slideably coupled to said guide element and being rearwardly translatable from the cabin to vary a volume thereof; and
   a first tonneau cover and a second tonneau cover each removeably coupled to the cargo bed, at least one of the first and second tonneau cover being uncoupled from the cargo bed prior to translating said rear wall, wherein at least one of the first tonneau cover and second tonneau cover are operable in a second position to enclose the volume existing between the rear wall and the cabin.

9. The pick-up truck of claim 8 wherein the cabin has a roof removably coupled thereto.

10. The pick-up truck of claim 8 wherein the rear wall, cabin, first tonneau cover and second tonneau cover are configured to accept at least one removable window.

11. The pick-up truck of claim 8 wherein the rear wall includes a seat.

12. The pick-up truck of claim 8 wherein the rear wall is a targa bar.

13. The pick-up truck of claim 8 wherein the base portion includes a plurality of casters which engage the guide member.

* * * * *